United States Patent Office 3,359,281
Patented Dec. 19, 1967

3,359,281
SEPARATION AND ISOLATION OF 2,2(2,4'-DIHYDROXYDIPHENYL)PROPANE AND 2,2,4 - TRIMETHYL 4(4' - HYDROXYPHENYL)CHROMAN FROM MIXTURES CONTAINING THE SAME
Hans L. Schlichting, Grand Island, and Ellis I. Lichtblau, Kenmore, N.Y., assignors to Hooker Chemical Corporation, Niagara Falls, N.Y., a corporation of New York
No Drawing. Filed Dec. 4, 1964, Ser. No. 416,132
15 Claims. (Cl. 260—345.2)

ABSTRACT OF THE DISCLOSURE 2,2,4-trimethyl 4(4'-hydroxyphenyl)chroman, a by-product formed in the production of Bisphenol-A (2,2,-(4,4'-dihydroxydiphenyl)propane) and/or its o-p' isomer, 2,2(2,4'-dihydroxydiphenyl)propane, and/or similar compounds which cannot be successfully separated from the chroman by distillation or by conventional extraction methods, can be separated from those compounds by adding to mixtures containing the codimer, a clathrating agent selected from the group consisting of short chain alcohols, short chain aliphatic ketones, and short chain chlorinated hydrocarbons having not more than one hydrogen on the carbon chain, forming a crystalline clathrate inclusion compound with said chroman, and thereafter separating the crystalline compound.

This invention relates to a process for the separation and isolation of 2,2(2,4-dihydroxydiphenyl)propane and 2,2,4-trimethyl 4(4'-hydroxyphenyl)chroman from each other and from mixtures containing the same. More particularly, this invention relates to a novel process for separating, isolating, and purifying said compounds from mixtures such as those produced in the production of Bisphenol-A.

2,2(4,4'-dihydroxydiphenyl)propane, technically called Bisphenol-A, is a compound of considerable importance in the production of plastics, such as epoxies, polycarbonates, etc. In the production of Bisphenol-A, such as by the condensation of phenol with acetone, the condensation of phenol with methyl acetylene or propadiene, and by other methods, a number of by-products are formed. A group of these by-products is characterized by their property of having boiling points close to that of Bisphenol-A, causing them, in the production of Bisphenol-A, to be separated as a group comprising essentially 2,2,(2,4'-dihydroxydiphenyl)propane referred to herein as the o-p' isomer, 2,2,4-trimethyl 4(4'-hydroxyphenyl)chroman, referred to herein as codimer, together with some Bisphenol-A.

Although each of these compounds is a well-known crystalline solid of high melting point, their mixture represents a resinous substance which up to now has resisted all efforts to commercially separate it into its individual constituents. The normal technical procedure, therefore, was to return this mixture to the reaction where it tended to be converted to Bisphenol-A.

It is an object of this invention to provide a method of separating and isolating 2,2(2,4'-dihydroxydiphenyl)propane from by-products of a Bisphenol-A process. It is another object of this invention to provide a method of separating and isolating 2,2,4-trimethyl 4(4'-hydroxyphenyl)chroman from mixtures containing the same. A further object is to provide a practical and commercially feasible method of producing 2,2(2,4'-dihydroxydiphenyl)propane and 2,2,4-trimethyl 4(4'-hydroxyphenyl)-chroman.

These and other objects will become apparent to those skilled in the art from the description of the invention.

In accordance with the present invention, a process is provided for separating 2,2,4-trimethyl 4(4'-hydroxyphenyl)chroman from mixtures containing the same, comprising adding a clathrating agent selected from the group consisting of short chain aliphatic alcohols, and short chain aliphatic ketones, to a mixture containing 2,2,4-trimethyl 4(4'-hydroxyphenyl)chroman, forming a crystalline clathrate inclusion compound with said chroman, separating the crystalline compound from the medium, and thereby isolating 2,2,4-trimethyl 4(4'-hydroxyphenyl)chroman as a crystalline clathrate.

In the conventional method of producing Bisphenol-A, the main product is 2,2(4,4'-dihydroxydiphenyl)propane, having a melting point of 157 degrees centigrade and a structural formula:

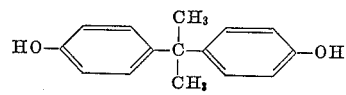

In addition, there is formed an o-p' isomer in amounts varying as high as 40 percent or even more, by weight of the diphenylolalkanes. This isomer, 2,2(2,4'-dihydroxydiphenyl)propane has a melting point of 111 degrees centigrade and the chemical structure:

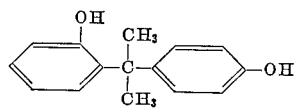

Another by-product is 2,2,4-trimethyl 4(4'-hydroxyphenyl)chroman, technically known as codimer or Dianin's compound, having a melting point of 158 degrees centigrade and a chemical structure:

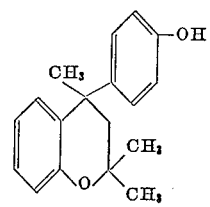

Various other trimeric, tetrameric and polymeric compounds are also formed in minor to trace amounts.

By the present invention it is found that the codimer can be precipitated out of mixtures containing o-p' isomer and p-p' isomer and the like in the form of its clathrating inclusion compound, leaving the mixture essentially free of codimer. The o-p' isomer can then be recovered substantially free of codimer by conventional methods, such as by distillation or crystallization.

It is known that the codimer has the ability to form clathrate inclusion compounds with numerous substances. However, the ability to form such clathrates is greatly repressed when the codimer is in admixture with Bisphenol-A, o-p' isomer, and/or other compounds. Most of the substances known to form clathrate inclusion compounds with codimer in its pure form are unable to precipitate codimer out of its mixture with Bisphenol-A, o-p' isomer and/or other admixtures. For instance, such well-known clathrating agents for codimer, as benzene and toluene, which form well-defined crystalline clathrate inclusion products with pure codimer, are unable to precipitate codimer out of its technical mixtures with Bisphenol-A, o-p' isomer, and/or other impurities.

However, by the present invention, it was found that clathrating agents selected from the group consisting of short chain aliphatic alcohols, and short chain aliphatic ketones, are able to precipitate the codimer in the form of a solid crystalline clathrate inclusion compound in spite of the presence of considerable quantities of o-p' isomer and Bisphenol-A.

The mother liquid, from which the codimer is precipitated and subsequently separated as a clathrate inclusion compound, then contains the o-p' isomer essentially pure or in admixture with Bisphenol-A, depending on whether previous separations had been effected. The o-p' isomer can be isolated in solid form out of the mother liquor by conventional methods such as vaporization of the solvent and recovering the o-p' isomer as the residue.

By a method of the present invention, a further purification of the o-p' isomer residue can be effected, e.g., specifically its separation from small amounts of impurities, by treatment with a chlorinated hydrocarbon, such as chloroform, carbon tetrachloride, tetrachloroethylene, trichloroethylene, ethylene dichloride, methylene chloride, and mixtures thereof, as well as other chlorinated compounds similar in properties to those recited and having 1 to 6 carbon atoms, thereby crystallizing a purified o-p' isomer.

The presence of large quantities of Bisphenol-A tends to interfere with the precipitation of the codimer as a clathrate inclusion compound. Such interference is also noted in the precipitation of the o-p' compound by means of a chlorinated hydrocarbon. Therefore, it is preferred to remove most of the Bisphenol-A by a fractional distillation under a high vacuum, to separate as distillate, a mixture of o-p' isomer and codimer, having a small percentage of Bisphenol-A, the bulk of the Bisphenol-A forming the residue of the fractionation.

In the preferred process of the present invention, a reaction mixture produced by the condensation of phenol with actone, under acidic conditions, is treated so as to remove the lower boiling by-products, for instance, by fractional distillation. The lower boiling by-products are comprised of unreacted ketone, phenol and products of partial reaction thereof. These low boiling compounds are first separated from the reaction mixture. A higher boiling fraction is then separated, comprising the o-p' isomer and the codimer. The remaining undistilled product is primarily the p-p' isomer. The separation can also be achieved by repeated extractions with a solvent such as benzene, toluene, or acetone, thereby producing a resin extract, or by other suitable methods.

If fractional distillation is used, the distillation is effected by known high vacuum techniques. Since diphenylolpropanes are high boiling compounds, normally solid at temperatures above 100 degrees centigrade, it is preferred to distill the compounds at the lowest possible temperature to reduce thermal degradation of the desired product. Therefore, the method of the present invention preferably employs distillation pressures about 0.1 to 5 millimeters of mercury.

When the impurities are separated from the p-p' isomer by solvent extractions, a resin extract results. The resin extract normally is a composition comprising about 20 to 50 percent p-p' isomer, 20 to 40 percent o-p' isomer, 10 to 30 percent codimer, in addition to other compounds. Mixtures separated by fractionation and/or by extraction or by other means from diphenylolpropane reaction mixtures are useful as starting materials for the present process.

If the concentration of p-p' isomer in this mixture is small, i.e., from 0 to about 40 to 50 percent, the codimer can be separated directly from mixtures containing p-p', o-p', and codimer, by crystallizing it with the clathrating agents of this invention. When larger percentages of p-p' isomer are present, the formation of the clathrate is somewhat repressed even when using the preferred clathrating agents.

In most instances it has been found preferable to fractionally distill the diphenylolpropane reaction products in order to separate the fraction containing primarily the o-p' isomer and the codimer. Distillation techniques normally employed in such separation processes effect a good separation of this fraction so that it comprises essentially the o-p' isomer and the codimer without the presence of the p-p' isomer. Presence in the second fraction of the p-p' isomer will affect the purity of the finally separated o-p' isomer. Therefore, depending on the purity desired in the o-p' isomer, the fractionation is effected to repress the presence of the p-p' isomer. Repeated fractionations can be used to assure such purity, but normally are not required.

The fraction comprising the o-p' isomer and codimer can not be successfully separated by distillation or by conventional extraction methods. However, a crystallization and subsequent separation can be effected by using a clathrating agent which acts as a guest molecule for the codimer thereby forming the crystalline clathrate. Short chain aliphatic carbinols having one to about ten carbon atoms, either straight chain or branched, especially methanol, ethanol, propanol, butanol, 2-propanol, tertiary butanol, and the like alcohols are the preferred clathrating agents. Such alcohols form crystalline clathrates of the codimer and permit easy separation by filtration.

In addition to the preferred alkanols used to form the codimer clathrate, short chain aliphatic ketones of one to six carbon atoms, such as acetone, methylethylketone, diethylketone, and the like, can be used. Although a number of compounds will form clathrate inclusion compounds with the codimer, the compounds which practically effect the crystallization in the present mixtures are limited.

In forming clathrate inclusion compounds, the codimer associates with the clathrating agent in a specific mole ratio, depending on the particular agent used, to give a clathrate having a specific melting point. Therefore, the clathrating agent is normally used in at least a stoichiometric proportion, based on the particular combining ratio. For instance, when the agent is methanol, the codimer combines with methanol in a mole ratio of six codimers to three methanol to produce a clathrate having a melting point of 155 to 156 degrees centigrade. The combining ration with ethanol, 2-propanol, n-butanol, acetone, and several other agents, is six codimer to two of the named compound to produce a clathrate having a melting point of 163 to 164 degrees centigrade for ethanol, 160 to 161 degrees centigrade for 2-propanol, 159 to 160 degrees centigrade for butanol and 159 to 160 degrees centigrade for acetone. The combining ratio with various compounds is found to vary widely from about 2 to 1 to about 10 to 1 codimer to clathrating agent, depending on the particular clathrating agent.

Having formed the codimer clathrate compound, it is separated from the o-p' isomer by filtering, centifuging or other liquid-solid separation techniques. The crystalline codimer clathrate is reconverted to the codimer by various suitable means, such as by melting under reduced pressure, vacuum distillation, dissolution in aqueous caustic solution and subsequent precipitation with carbon dioxide and the like. Thus, the codimer is isolated in a purified form.

When the separation is effected on an o-p' isomer-codimer fraction, the filtrate, remaining after removing the codimer clathrate, contains primarily the o-p' isomer and solvent. The o-p' isomer is isolated by evaporating the filtrate to dryness. It can be further purified by treating the residue with a chlorinated hydrocarbon. Preferably, the residue is treated with the chlorinated hydrocarbon at an elevated temperature close to the boiling point of the solvent employed. Suitable chlorinated hydrocarbon solvents include chloroform, carbon tetrachloride, tetrachloroethylene, trichloroethylene, ethylenedichloride, methylene chloride and mixtures thereof, as well as other chlorinated compounds similar in properties to those recited and having one to six carbon atoms and one or more chlorine substituents.

The treatment of the residue with a chlorinated hydrocarbon solvent effects a crystallization of the o-p' isomer in a substantially pure form, having a melting point of 109 to 110 degrees centigrade. If desired, a further purification step can be effected by recrystallization from benzene, toluene, or similar solvents, thereby forming a highly purified product having a melting point of 111 degrees centigrade.

The following examples illustrate certain preferred embodiments of the present invention. Unless otherwise indicated, all parts and percentages used herein are by weight and all temperatures in the examples and claims are in degrees centigrade unless otherwise indicated.

*Example 1*

Bisphenol-A, produced by reacting phenol with acetone under acidic conditions, was purified by extraction with benzene. A separation was thereby effected resulting in a resin extract, i.e., the benzene extracted material, and a purified p-p' isomer.

The resin extract (1000 parts) was placed in a distillation vessel and fractionally distilled through a column packed with stainless steel packings. The distillation was effected by drawing a high vacuum while heating the mixture. In this manner, two fractions were removed from the distillation column and a third fraction remained in the distillation apparatus. The first fraction removed was obtained at a head temperature between 100 and 150 degrees centigrade under a pressure of 0.3 millimeter of mercury. This fraction amounted to 43 parts.

A second fraction was subsequently obtained at a head temperature between 161 and 165 degrees centigrade under a pressure of 0.3 millimeter of mercury. The second fraction amounted to 550 parts. A third fraction remained in the distillation vessel.

The first fraction of 43 parts was determined to be o-o' isomer, unreacted phenol, isopropylphenol, and isopropenylphenol.

The second fraction was analyzed by gas chromatography and found to consist primarily of the o-p' isomer and codimer. The second fraction was treated at a temperature of 70 to 75 degrees centigrade with 500 parts of ethanol and cooled, thereby yielding a white crystalline precipitate. On filtering, 376 parts of crystalline codimer clathrate were recovered.

The recovered crystalline codimer clathrate product was placed in a second distillation vessel and heated at a temperature of 170 degrees centigrade under a vacuum of 0.5 to 1.0 millimeter of mercury. Codimer (350 parts) having a melting point of 158 degrees centigrade was thereby obtained.

The mother liquor of the crystalline codimer clathrate was then evaporated to dryness yielding 271 parts of residue. The residue was treated at 80 to 85 degrees centigrade with 300 parts of trichloroethylene and cooled. From this 230 parts of 2,2(2,4'-dihydroxydiphenyl)propane, having a melting point of 109 degrees centigrade were precipitated and separated by filtration. The filtrate contained another five parts of the o-p' isomer which were recovered by slowly evaporating the solvent. Then 230 parts of recovered o-p' isomer were then recrystallized from 140 parts of benzene yielding 207 parts of a highly purified o-p' isomer having a melting point of 110.5 degrees centigrade.

*Example 2*

A mixture of diphenylolpropanes was produced by reacting 232 grams of acetone (4 moles) with 1504 grams of phenol (16 moles). The reaction was effected at 75 degrees centigrade by agitating the mixture while a steady flow of dry HCl gas was passed through the mixture. After seven hours, the reaction mixture was poured onto an ice and water mixture. The organic layer was separated from the water layer and fractionally distilled first at 10 to 20 millimeters of mercury pressure to remove the water-phenol-hydrochloric acid azeotrope, and then at 0.5 to 0.6 millimeter of mercury pressure to distill the product as in Example 1.

Table I indicates the several fractions separated at the various distillation temperatures and pressures.

TABLE I

| Fraction | Distillation Head Temperature, degrees centigrade | Pressure, millimeters of mercury | Grams Distilled | Composition |
|---|---|---|---|---|
| 1 | 80–100 | 10–15 | 780 | Mostly phenol. |
| 2 | 120–150 | 0.5 | 10 | o,o'-Isomer, isopropenyl phenols. |
| 3 | 163–166 | 0.5 | 120 | o-p'-Isomer, codimer. |
| 4 | 182–188 | 0.5 | 720 | p,p'-Isomer. |
| Residue | Over 200 | 0.5 | 20 | Tar. |

The first fraction removed comprised primarily phenol. In a commercial scale operation, this fraction would be recycled to the reactor for further production of diphenylolpropane. The second fraction removed comprised primarily the o-o' isomer which can be separated and recovered as a pure product or recycled to the reactor. The third fraction was treated with hot methanol to yield on cooling, 30 grams of codimer methanol clathrate having a melting point of 156 degrees centigrade. The codimer clathrate was readily separated from the solvent solution by filtration. The filtrate was then evaporated to dryness leaving a residue of 93 grams. The dry residue was then treated at 70 to 80 degrees centigrade with 100 milliliters of chloroform. On cooling, 88 grams of crystalline material was precipitated and recovered by filtration. The separated crystals were o-p' isomer, 2,4'-dihydroxy-2,2-diphenylpropane, having a melting point of 110 degrees centigrade.

The previously separated codimer methanol clathrate was dissolved in hot, about 10 percent aqueous sodium hydroxide solution. Carbon dioxide was then bubbled through the solution and a purified codimer, having a melting point of 158 degrees centigrade was obtained as a precipitate.

It is thus seen that the present invention provides a simplified method, readily adapted to commercial operations, for separating two valuable monomers from a reaction mixture of diphenylolpropanes. The disclosed method is also useful in separating the o-p' isomer and codimer from other mixtures wherein it might occur. The present process thus makes available the o-p' isomer in a pure form which can be used as a starting material in the production of high polymers, such as polycarbonates. The o-p' isomer can also be used in combination with the p-p' isomer without contamination with the codimer and thereby obtain certain desirable properties in the higher polymers made from such purified mixtures.

It has further been observed that the reaction conditions in producing diphenylolpropane can be modified to favor the production of the o-p' isomer as in Example 2 and thus produce it in larger amounts than normally obtained in the production of Bisphenol-A. By effecting the reaction of phenol and acetone in proportions employed in the synthesis of diphenylolpropanes, and at a higher temperature than those normally employed, i.e., a temperature in the range of 50 to 100 degrees centigrade and more preferably about 75 degrees centigrade, the o-p' isomer is formed in an amount of up to 40 percent or more of the diphenylolalkanes. Other modifications of the process can be made in order to produce larger percentages of o-p' isomer, including operating with alkaline catalysts at much higher temperatures and the like modifications.

The o-p' isomer obtained by the process of this invention is a valuable monomer useful in the preparation of polycarbonates, polyesters, and epoxy resins. In addition, various other uses can be made of this isomer, for instance, as a modifier in the preparation of various polymers and as an intermediate in the preparation of stabilizers for polyolefins, natural and synthetic rubbers, and the like. The codimer is useful as an extender and modifier for epoxy resins, polycarbonate resins, and the like.

While there have been described various embodiments of the present invention, the methods and elements described are not intended to be understood as limiting the scope of this invention, as it is realized that changes therewithin are possible. It is intended that each and every element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A process for separating 2,2,4-trimethyl 4(4-hydroxyphenyl)chroman from mixtures containing the said chroman and a compound which cannot be successfully separated from the chroman by distillation or by conventional extraction methods comprising adding a clathrating agent selected from the group consisting of short chain aliphatic alcohols, and short chain aliphatic ketones to a mixture containing 2,2,4-trimethyl 4(4'-hydroxyphenyl)chroman, forming a crystalline clathrate inclusion compound with said chroman and separating the crystalline compound from the medium.

2. The process of claim 1 wherein 2,2,4-trimethyl 4(4'-hydroxyphenyl)chroman is obtained by heating the crystalline clathrate under vacuum.

3. The method of claim 1 wherein 2,2,4-trimethyl 4(4'-hydroxyphenyl)chroman is obtained by digesting the crystalline clathrate in aqueous sodium hydroxide and subsequently precipitating 2,2,4-trimethyl 4(4'-hydroxyphenyl)chroman by the addition of carbon dioxide to the aqueous sodium hydroxide containing the clathrate.

4. A process for separating 2,2,4-trimethyl 4(4'-hydroxyphenyl)chroman from mixtures obtained in the production of diphenylolpropanes comprising separating the fraction comprising 2,2,4-trimethyl 4(4'-hydroxyphenyl)chroman and 2,2(2,4'-dihydroxydiphenyl) propane from a mixture containing the same, adding a clathrating agent to said separated mixture selected from the group consisting of short chain aliphatic alcohols, and short chain aliphatic ketones forming a crystalline clathrate inclusion compound with said chroman and separating the crystalline compound from the medium.

5. A process for separating 2,2,4-trimethyl 4(4'-hydroxphenyl) chroman from mixtures obtained in the production of diphenylolpropanes comprising heating a mixutre containing 2,2,4-trimethyl 4(4'-hydroxyphenyl)chroman and 2,2(2,4'-dihydroxydiphenyl)propane under a vacuum of 0.1 to 5 millimeters of mercury pressure, separating the fraction comprising 2,2,4-trimethyl 4(4'-hydroxyphenyl)chroman and 2,2(2,4'-dihydroxydiphenyl)propane, adding a short chain aliphatic alcohol to said separated fraction, forming a crystalline clathrate with said chroman and separating the crystalline clathrate from the medium.

6. The method of claim 5 wherein the clathrating agent is subsequently separated from the crystalline clathrate to obtain a purified 2,2,4-trimethyl 4(4'-hydroxydiphenyl)chroman.

7. A process for separating 2,2,4 - trimethyl 4(4'-hydroxyphenyl)chroman from a mixture of the same and 2,2(2,4'dihydroxydiphenyl)propane comprising adding a short chain aliphatic alcohol to a mixture of 2,2,4-trimethyl 4(4'-hydroxyphenyl)chroman and 2,2(2,4'-dihydroxydiphenyl)propane, forming a crystalline clathrate compound with said chroman and separating the crystalline compound from the crystallizing medium.

8. A process for separating 2,2(2,4'-dihydroxydiphenyl)propane from mixtures containing the same and 2,2,4-trimethyl 4(4'-hydroxyphenyl)chroman, comprising adding a clathrating agent selected from the group consisting of short chain aliphatic alcohols, and short chain aliphatic ketones, to a mixture containing 2,2(2,4'-dihydroxydiphenyl)propane and 2,2,4-trimethyl 4(4'-hydroxyphenyl)chroman, forming a crystalline clathrate inclusion compound with said chroman, separating the crystalline clathrate from the medium and subsequently separating 2,2(2,4'-dihydroxydiphenyl)propane from the mother liquor.

9. The process of claim 8 wherein the crystalline clathrate is separated from the medium by filtration and the mother liquor is subsequently fractionally distilled to separate 2,2(2,4'-dihydroxydiphenyl)propane therefrom.

10. The process of claim 8 wherein the crystalline clathrate is separated from the medium by filtration, the mother liquor is evaporated to dryness and 2,2(2,4'-dihydroxydiphenyl)propane crystallized from the residue by the addition of a chlorinated hydrocarbon of one to six carbon atoms.

11. A process for separating 2,2(2,4'-dihydroxydiphenyl)propane from a mixture containing the same and 2,2,4-trimethyl 4(4-hydroxyphenyl)chroman, comprising heating a mixture containing 2,2(2,4'-dihydroxydiphenyl)propane and 2,2,4-trimethyl 4(4-hydroxyphenyl)chroman under a vacuum of 0.1 to 5 millimeter of mercury pressure, separating the fraction comprising 2,2(2,4'-dihydroxydiphenyl)propane and 2,2,4-trimethyl 4(4-hydroxyphenyl)chroman therefrom, adding a clathrating agent selected from the group consisting of short chain aliphatic alcohols, and short chain aliphatic ketones, to the separated fraction, forming a crystalline clathrate with said chroman, separating the crystalline clathrate from the mother liquor, drying the mother liquor and thereby obtaining 2,2(2,4-dihydroxydiphenyl) propane as residue.

12. The method of claim 11 wherein the dried mother liquor is treated with a chlorinated hydrocarbon of one to six carbon atoms to produce a purified crystalline 2,2 (2,4'-dihydroxydiphenyl)propane.

13. A process for separating 2,2(2,4'-dihydroxydiphenyl)propane from a mixture obtained in the production of diphenylolpropanes comprising separating the fraction containing the 2,2(2,4'-dihydroxydiphenyl)propane and 2,2,4-trimethyl 4(4'-hydroxyphenyl)chroman from the diphenylolpropane mixture, adding a short chain alcohol to the separated fraction, forming a crystalline clathrate inclusion compound with the chroman, separating the crystalline clathrate from the mother liquor, thereby obtaining a separated 2,2-(2,4-dihydroxydiphenyl)propane in the mother liquor.

14. The process of claim 13 wherein a purified 2,2(2, 4'-dihydroxydiphenyl)propane is separated from the mother liquor by drying the mother liquor and subsequently treating the residue with a chlorinated hydrocarbon of one to six carbon atoms thereby crystallizing a purified 2,2(2,4'-dihydroxydiphenyl)propane.

15. A process for sepaarting 2,2(2,4'-dihydroxydiphenyl) propane and 2,2,4-trimethyl 4(4'-hydroxyphenyl chroman from mixtures obtained in the production of Bisphenol-A comprising fractionally distilling a mixture obtained in the production of Bisphenol-A to separate a fraction comprising 2,2(2,4'-dihydroxydiphenyl)propane and 2,2,4-trimethyl 4(4'-hydroxyphenyl)chroman, adding a short chain aliphatic alcohol to the separated fraction, forming a crystalline clathrate with said chroman, separating the crystalline clathrate from the motor liquor thereby separating 2,2,4-trimethyl 4(4'-hydroxyphenyl)chroman as a clathrate, drying the mother liquor to obtain a residue, treating the residue with a chlorinated hydrocarbon of one to six carbon atoms and thereby crystallizing a purified 2,2(2,4'-dihydroxydiphenyl)propane.

References Cited

UNITED STATES PATENTS 3,169,996  2/1965  Bostian et al. _____ 260—345.5

WALTER A. MODANCE, *Primary Examiner.*

JOHN M. FORD, *Assistant Examiner.*